(12) United States Patent
Heckmayr

(10) Patent No.: US 7,341,216 B2
(45) Date of Patent: Mar. 11, 2008

(54) DEVICE FOR CONTROLLING A SEAT BELT RETRACTOR

(75) Inventor: Alexander Heckmayr, Ottobeuren (DE)

(73) Assignee: Key Safety System, Inc., Sterling Heights, MI (US)

( * ) Notice: Subject to any disclaimer, the term of this patent is extended or adjusted under 35 U.S.C. 154(b) by 337 days.

(21) Appl. No.: 11/175,852

(22) Filed: Jul. 6, 2005

(65) Prior Publication Data

US 2006/0097097 A1    May 11, 2006

(30) Foreign Application Priority Data

Nov. 9, 2004    (DE)    ............. 10 2004 054 078

(51) Int. Cl.
B60R 22/36    (2006.01)
B60R 22/46    (2006.01)
B60R 22/34    (2006.01)

(52) U.S. Cl. ............... 242/374; 242/375.1; 242/384

(58) Field of Classification Search ............ 242/374, 242/375.1, 375.3, 383, 383.2, 384, 390.8, 242/390.9; 297/477, 478; 280/806, 807; 180/269
See application file for complete search history.

(56) References Cited

U.S. PATENT DOCUMENTS

| 4,592,520 | A | * | 6/1986 | Kawaguchi | ............... 242/372 |
| 4,630,841 | A | * | 12/1986 | Nishimura et al. | ......... 280/806 |
| 5,690,295 | A | | 11/1997 | Steinberg et al. | |
| 6,196,487 | B1 | | 3/2001 | Specht et al. | |
| 6,283,398 | B1 | | 9/2001 | Specht | |
| 6,290,159 | B1 | | 9/2001 | Specht et al. | |
| 6,343,759 | B1 | * | 2/2002 | Specht | ............... 242/375.1 |
| 6,360,981 | B1 | * | 3/2002 | Specht | ............... 242/390.8 |
| 6,371,397 | B1 | | 4/2002 | Specht | |
| 6,390,403 | B2 | * | 5/2002 | Specht | ............... 242/374 |
| 6,598,821 | B2 | * | 7/2003 | Specht | ............... 242/374 |
| 2003/0116956 | A1 | * | 6/2003 | Bullinger et al. | ........... 280/806 |

FOREIGN PATENT DOCUMENTS

| DE | 196 02 549 A1 | 8/1996 |
| EP | 0 629 531 B1 | 4/1997 |
| GB | 2 325 896 A | 12/1998 |
| WO | WO 00/71394 A1 | 11/2000 |

* cited by examiner

Primary Examiner—Peter M. Cuomo
Assistant Examiner—Scott Haugland
(74) Attorney, Agent, or Firm—Lonnie Drayer

(57) ABSTRACT

A seat belt retractor has a winding shaft to wind a seat belt. A motive spring pretensions the winding shaft in the winding direction of the seat belt. An electric motor provides a torque that can be transmitted to the motive spring to change the spring force. A switch coupling transmits the torque of the electric motor drive to the winding shaft to retract the seat belt. To transmit the torque, a drive wheel, which is rotatably mounted on a shaft non-rotatably and coaxially connected to the winding shaft and which is non-rotatably connected to an outer spring end of the motive spring by a rigid rotational connection. A first active surface of the coupling is movably mounted against a restoring force to a component that is securely connected to the rigid rotational connection and rotatable around the shaft. A second active surface of the coupling is non-rotatably connected to the shaft.

18 Claims, 7 Drawing Sheets

DEVICE FOR CONTROLLING A SEAT BELT RETRACTOR

FIELD OF THE INVENTION

The present invention relates to a device for controlling at least one function of a seat belt retractor.

DISCUSSION OF THE PRIOR ART

U.S. Pat. No. 6,371,397 B1 teaches a seat belt retractor wherein torque is transmitted at a low rotational speed from a drive means to a motive spring to change the spring force. The device has a coupling that, at a high rotational speed, transmits the torque created by the drive means to the winding shaft for winding of the seat belt. The torque transmission can be carried out by a worm gear. The transmission, with which the torque of the drive means is transmitted to the winding shaft, and the motive spring are located on one side of the retractor or the winding shaft.

WO 00/71394 A1 teaches a switch coupling that, depending on a signal issued in a pre-crash situation, transmits a torque created by an electric motor to the belt reel to pretension the seat belt. A gear can be located between the output shaft of the electric motor and the winding shaft, whereby the gear and the motive spring, the spring force of which can also be adjusted by the electric motor, are arranged on one side of the belt retractor or the winding shaft.

In the known seat belt retractors, the spring force of the motive spring and the comfort for the wearer of the seat belt can be adjusted during normal driving conditions. The spring force can be increased to take up the seat belt in a storage position during removal of the seat belt. The torque transmitted from the electric motor at an increased rotational speed to the belt reel can be put to use in a driving situation in which a high pre-crash likelihood is present.

SUMMARY OF THE INVENTION

In the present invention the torque created by an electric motor is transmitted via a coupling to at least one component of a seat belt retractor, for instance the winding shaft or the motive spring, or to a belt webbing sensor activated by the winding shaft rotation whereby, after the application of the seat belt with the transmitted torque, the seat belt retractor is adjusted into a function, which is the starting position for adjustable functions in normal driving conditions and in dangerous driving conditions.

For this starting position, after the application of the seat belt, at least the belt slack of the applied belt webbing is removed by the torque transmitted to the winding shaft of the seat belt retractor.

After the application of the seat belt by the torque transmitted from the coupling, the motive spring is preferably rotated by the electric motor into a comfort position, in which the seat belt is applied with a reduced belt webbing force. This adjusting of the comfort position is preferably carried out after the belt slack has been removed from the belt webbing applied to the body of the vehicle occupant. The coupling, for instance on the basis of a reduced rotational speed created by the electric motor which can be reduced to zero or opened due to a reversal of the rotational direction, so that only a rotational connection remains with one of the two fixing points of the motive spring for its adjustment into the comfort position.

The adjusting of additional functions is carried out from the starting position, in which at least the belt slack is removed from the applied belt webbing and the belt webbing adopts a standard position. As already mentioned, the belt webbing is preferably brought from this standard position into the comfort position as a starting position.

DETAILED DESCRIPTION OF THE INVENTION

Figure 1:
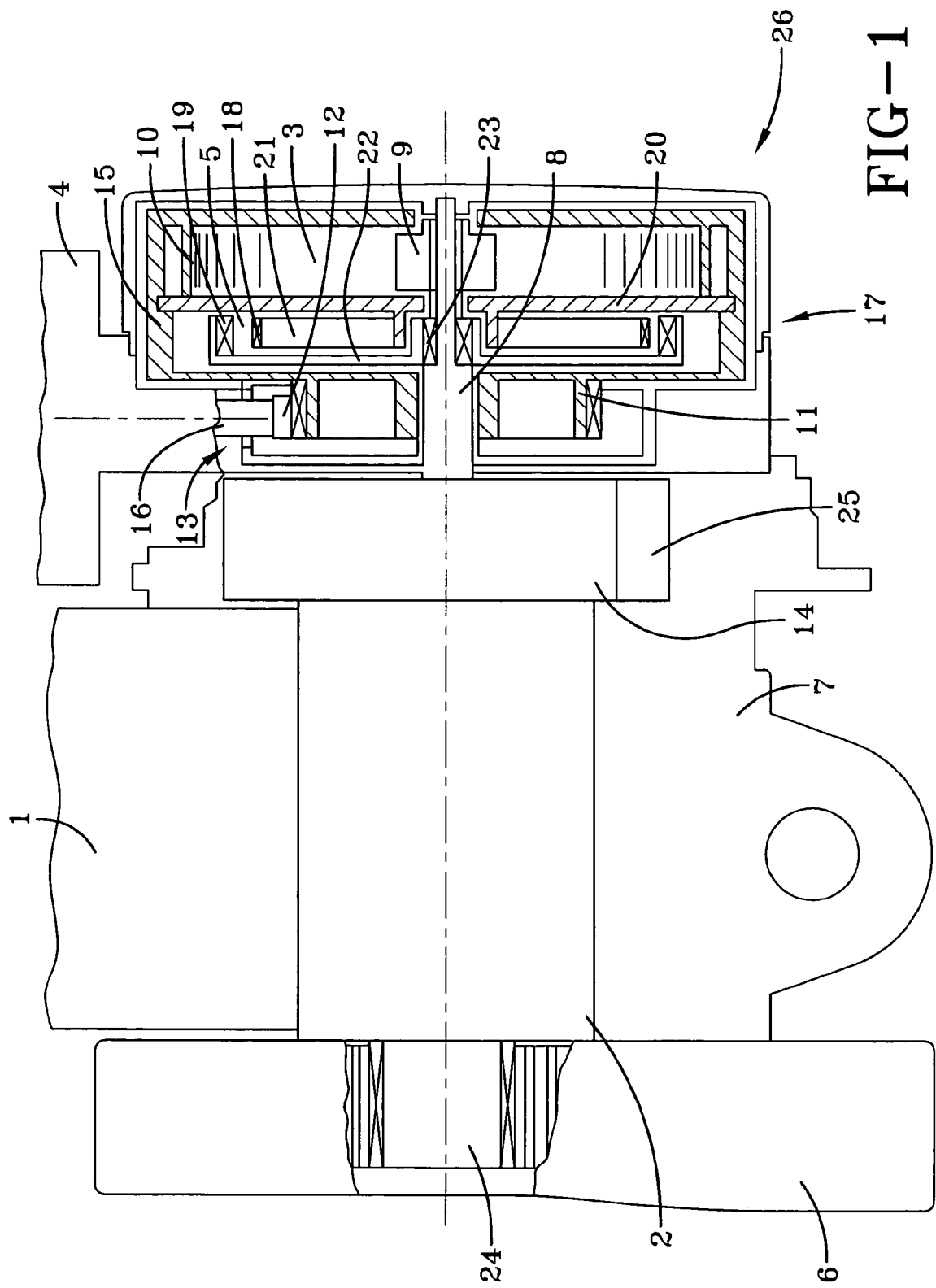
FIG. 1 is a schematic view of a seat belt retractor, with which various functions can be implemented in accordance with the invention.

FIG. 1 shows an embodiment of a seat belt retractor 26 for a seat belt 1, which can be installed into a motor vehicle. The seat belt retractor 26 comprises a winding shaft 2 to wind the seat belt 1 and a motive spring 3 to pretension the winding shaft 2 in the winding direction of the seat belt 1. With the aid of a direct current electric motor drive 4, the spring force of the motive spring 3 and the drive of the winding shaft 1, in particular in the event of a pre-crash situation, can be adjusted.

To transmit the torque created by the electric motor drive 4 to the motive spring 3 and to the winding shaft 2, a gear 13, which shall be explained in more detail below, and a coupling 5 are used. The gear 13 can be a gear wheel, or a screw gear, for instance with a front screw gear, or a worm gear.

The gear 13, the coupling 5 and the motive spring 3 are preferably a pre-assembled unit. The electric motor drive 4 can be subsequently secured to the unit or can be pre-assembled as a component of the unit. As shown, the unit is mounted on the so-called mechanical side of the seat belt retractor. The mechanical side of the seat belt retractor comprises in a conventional manner the vehicle sensitive sensor and the belt webbing sensitive sensor. These two sensors are designed in a known manner and in the shown embodiment are diagrammatically illustrated as a sensor 14. The vehicle sensitive part of the sensor 14 reacts to an excessive acceleration or braking of the vehicle and causes a blocking of the winding shaft 2. The belt webbing sensitive part of the sensor 14 reacts to an excessive revolution acceleration of the winding shaft and also causes a blocking of the winding shaft 2. This type of sensor, which comprises the vehicle sensitive and the belt webbing sensitive part, is for instance, known from U.S. Pat. No. 6,283,398 B1 which is incorporated herein by reference for teaching sensors that may be employed in the practice of the present invention.

To transmit each torque of the electric motor, the gear 13 shown in the illustrated embodiment comprises a drive wheel 11, which is rotatably mounted on a shaft or shaft extension 8 non-rotatably connected to the winding shaft 2 which is non-rotatably connected to a spring end, in particular the outer spring end of the motive spring, by a rigid rotational connection. The shaft or shaft extension 8 is an axial extension of the winding shaft 2. The torque created by the electric motor drive 4 is transmitted to the drive wheel 11 via a further gear part, for instance a front screw gear 12 or a worm gear. This torque transmission is suitable in an arrangement of the electric motor drive as shown in the figure, in which an output shaft 16 of the electric motor drive extends perpendicularly to the axis of the shaft 8. In a parallel arrangement of the output shaft 16 of the electric motor drive 4, the force transmitting gear part can be a drive belt or gear wheel or gear wheel pair.

A rotational connection 15, which is rigid at least during the force or torque transmission, is provided for transmission of force or torque from the drive wheel 11 to the motive spring 3. The rigid rotational connection 15 is preferably permanently provided. In this case the drive wheel 11 is non-rotatably connected to an outer spring end 10 of the motive spring 3. The rigid rotational connection 15 is rotationally mounted around the shaft 8. The rigid rotational connection 15 can for instance be securely connected to a spring housing 20, in which the motive spring 2 is arranged on a side of the spring housing 20.

The coupling 5 comprises a first active surface 18, which is movably arranged to a component that is non-rotatably connected to the drive wheel 11 against the force of a (not further represented) restoring spring. In the shown embodiment, the first active surface 18 is located on a coupling part 21 mounted in a movable manner to the spring housing 20 on an opposite side of the spring housing relative to the motive spring 3. The second active surface 19 of the coupling 5 is non-rotatably connected to the shaft 8. In the shown embodiment a second coupling part 22 is provided, on which the second active surface 19 is located and which is non-rotatably connected to the shaft 8 at a fastening point 23, for instance by wedge gearing. In this manner a non-rotatable connection is created between the second active surface 19 of the coupling 5 and the winding shaft 2. In a known manner the two active surfaces 18, 19 of the coupling 5 can be gears, frictional surfaces or the like, which engage one another during engagement of the coupling. A suitable coupling means can for instance be a coupling as known from U.S. Pat. No. 6,196,487 B1 which is incorporated herein by reference for teaching coupling means that may be employed in the practice of the present invention. The coupling engagement can be created by an electromagnetic switch signal or by inertial forces.

In the shown embodiment, the components of the coupling 5 are located between the drive wheel 11 and the motive spring 3, in particular the spring housing 20. In this case the components of the coupling 5 are bridged by the rigid rotational connection 15. In this manner an extremely compact structure of the unit 17 can be achieved, comprising the gear 13, the coupling 5 and the motive spring 3, which can be preferably accommodated in a joint housing. The gear 13, the coupling 5 and the motive spring 3 can be pre-assembled with one other in a flat arrangement as the unit 17 and positioned on the shaft 8 on the mechanical side of the seat belt retractor. It is possible to carry out the assembly of the components of the unit 17 one after the other in a simple manner on the shaft 8 projecting beyond the mechanical side and to subsequently encapsulate them in a joint housing. This gives the advantage that conventionally assembled seat belt retractors can be provided with an electric motor for pre-tightening the seat belt in a pre-crash situation, and with an adjustment means for the motive spring force.

The axial order of the sandwich arrangement of the drive wheel 11, the coupling 5 and the motive spring 3 can also be exchanged if required by assembly requirements. For instance, the inner drive wheel 11 or the parts of the coupling 5 can be located on the outside and the motive spring 3 can be arranged between the drive wheel 11 and the coupling 5. Any other axial order of the components is, however, also possible.

If the function of a power tightener with a compact arrangement is foreseen, the power tightening can preferably be provided by a pyrotechnic driven tightening means 6 on the other side of the seat belt retractor or the winding shaft 2, as shown in FIG. 1. The pyrotechnic driven tightening means can be designed in a known manner, as known from EP 0 629 531 B1 or DE 196 02 549 A1 which are both incorporated herein by reference for teaching pyrotechnic drive tightening means that may be employed in the practice of the present invention. In these known tightening drives, the pyrotechnic created drive force is transmitted from a mass weight in the shape of a toothed rack or from several mass weights arranged in a channel-shaped guide to a drive wheel connected to the belt reel in a secure manner or via a coupling. A further possible embodiment of the tightening device is known from GB 2,325,896 A which is incorporated herein by reference for teaching a tightening device that may be employed in the practice of the present invention.

In combination with the electric motor, the torque of which on the other side of the seat belt retractor or the winding shaft is transmitted to the motive spring and the winding shaft, a compact arrangement of the seat belt retractor is achieved, resulting in a comfort in wear through adjustment of the spring force at a low rotational speed of the electric motor drive and in a belt tightening in a pre-crash situation at an increased rotational speed by transmission of the torque of the electric motor drive to the winding shaft.

A drive wheel 24 that is non-rotatably connected to the winding shaft 2 is preferably provided. The drive wheel 24 can be connected to the winding shaft 2 via a coupling that is to be engaged for the tightening purpose. The tightening drive can be arranged in a known manner, whereby a toothed rack drive, as known for instance from EP 0 629 531 B1 which is incorporated herein by reference for teaching a tightening drive that may be employed in the practice of the present invention, or drive bodies arranged one after the other in a guide channel, as known for instance from GB 2,325,896 A which is incorporated herein by reference for teaching a tightening drive that may be employed in the practice of the present invention, or ball-shaped drive bodies, can act upon the drive wheel 24, as known from U.S.

Pat. No. 5,690,295 A which is incorporated herein by reference for teaching a tightening drive that may be employed in the practice of the present invention. In this manner a seat belt retractor is provided having a compact arrangement for the adjustment of the motive spring force, the function of the pre-tightening in a pre-crash situation and the function of the power tightening in a crash are integrated in a compact arrangement.

The mode of operation of the embodiment shown in the figure is as follows.

To adjust or change the spring force of the motive spring 3, the electric motor drive 4 creates at a low rotational speed a torque, which is transmitted from the drive wheel 11 via the rigid rotational connection 15 to the outer spring end 10 of the motive spring 3. By twisting the outer spring end 10, according to rotational direction of the output shaft 16 of the electric motor drive 4, the spring force of the motive spring 3 is increased or reduced. For instance, by returning the seat belt 1 into the parking position after removal of the seat belt, the restoring force of the motive spring 3 can be correspondingly raised. When the seat belt 1 is applied, the restoring force of the motive spring 3 can be reduced to increase comfort in wear. After application of the seat belt, an increased restoring force can be created by the motive spring 3, to apply the seat belt to the body of the vehicle occupant in a perfect manner. Subsequently the already mentioned reduced restoring force of the motive spring 3 can be adjusted, to adjust the comfort in wear during normal driving conditions.

To transmit the output torque of the electric motor drive 4 to the winding shaft 2, the coupling 5 is brought into an engaged position. The coupling 5 can be a switch coupling, which for instance in a pre-crash situation of the vehicle operation is brought into an engaged position by a corresponding electrical impulse. The switch coupling 5 can be designed such that it is brought into engagement automatically at an increased rotational speed of the electric motor drive 4 by inertial force or by centrifugal force. A suitable rotational speed-dependent activated coupling is taught in U.S. Pat. No. 6,196,487 B1 which is incorporated herein by reference for teaching a coupling means that may be employed in the practice of the present invention. The coupling can also be activated depending on the acceleration created by the motor.

The drive force created by the electric motor drive 4 can be reversibly transmitted to the winding shaft 2 via the shaft 8. If no crash occurs after the pre-crash situation, the coupling 5, for instance by a quick rotation of the electric motor drive 4 in the opposite direction, can be released and the belt webbing application force used for normal driving conditions can be restored on the seat belt through corresponding adjustment of the restoring force of the motive spring 3.

In a crash the pyrotechnic driven tightening means 6 is activated, so that by retensioning with a high retracting force, the vehicle occupant is pulled back and held in the vehicle seat.

The electric motor drive 4 can also be activated when the vehicle occupant is out of position beyond a certain timeframe. The vehicle occupant is then brought back into a normal seating position by the restoring force created by the electric motor drive 4.

In a preferred manner, the pyrotechnic tightening means and the unit 17 are secured to a common frame, in particular to the seat belt retractor frame 7, which is to be secured to the vehicle structure, so that the reaction forces created during the drive of the electric motor and of the pyrotechnic tightening means are absorbed or taken up by the motor vehicle structure via the seat belt retractor frame.

Figure 2:
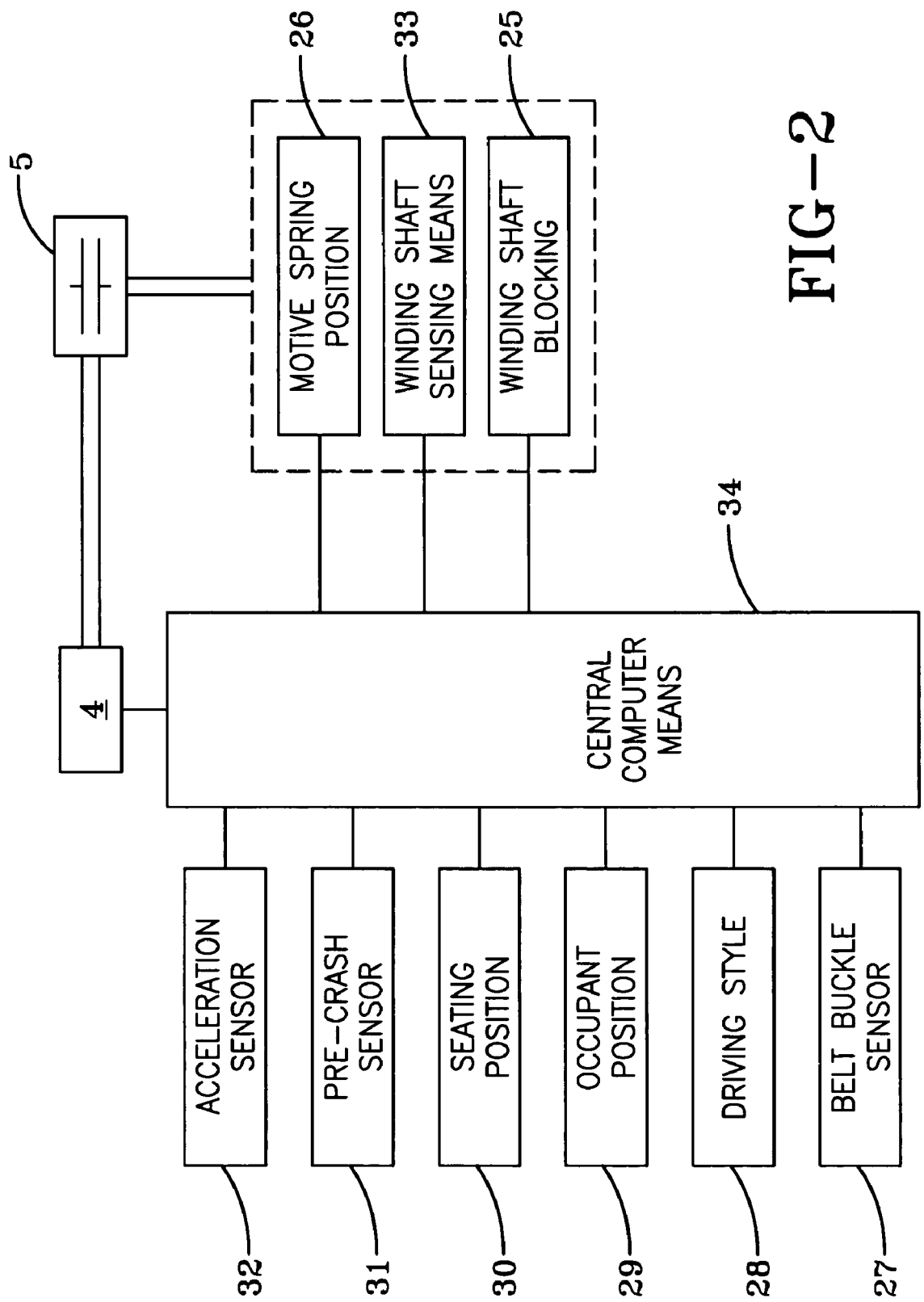
FIG. 2 is a block diagram of a seat belt system employing an embodiment of the invention.

The mode of operation of the invention is described in more detail with reference to FIGS. 2 and 3.

Figure 3:
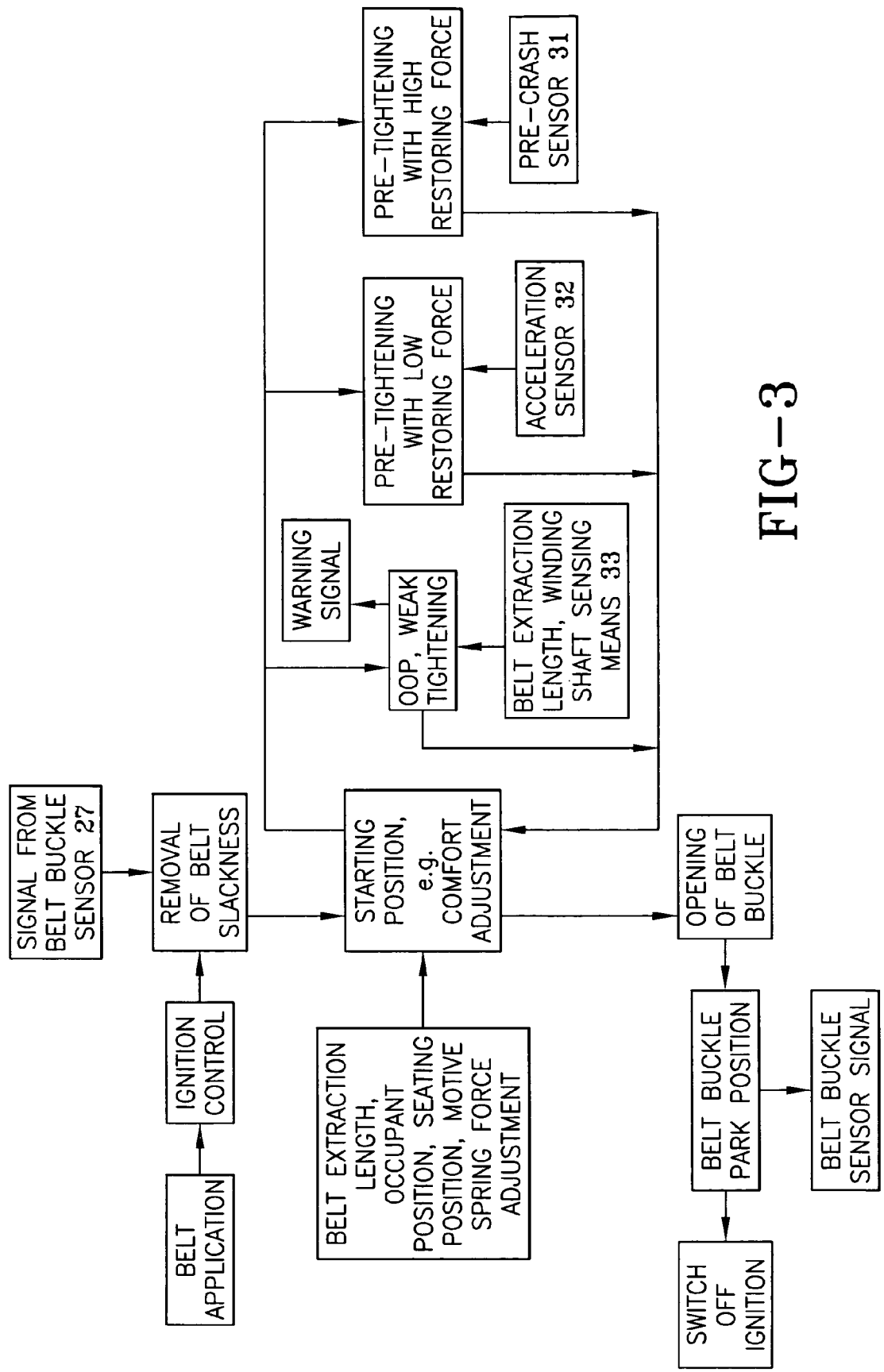
FIG. 3 is a block diagram of various functions which, according to the invention, can be fulfilled with the aid of the torque created by an electric motor.

FIG. 3 is a diagram showing driving situations arising during the operation of a motor vehicle and the corresponding influences of the restraint system on the vehicle occupant can be divided into two groups. One group representing normal driving conditions is shown in FIG. 3 on the left side of the representation while the other group representing dangerous driving situations with degrees of differences is shown on the right side. To fulfil all required restraint functions as rapidly as possible, the seat belt retractor is brought into a starting position from which the functions required for both normal driving conditions and dangerous driving situations can be rapidly achieved.

In the embodiment shown in FIG. 3 the starting position consists of the belt webbing comfort in wear after the application of the seat belt by corresponding adjustment of the restoring force of the motive spring in the winding direction. It is possible to select the operating state as the starting position, in which the belt slack has been removed after the application of the seat belt with the aid of torque of the electric motor transmitted to the winding shaft of the seat belt retractor.

As can be seen from the block diagram, first the seat belt is applied by the vehicle occupant. This situation is detected by a belt buckle sensor 27 (FIG. 2) and communicated to a central computer 34, which is an electronic evaluating means. The central computer 34 can be integrated with the on-board computer of the vehicle or constitute a separate computer unit. After triggering of the ignition, the central computer 34 emits a signal to the electric motor drive 4 to remove the belt slack remaining after the application of the seat belt.

To remove the belt slack, the electric motor drive 4 is first briefly brought to a rotational speed at which the coupling 5, as described above, is brought into the engaged position. In this manner the electric motor drive 4 comes into rotational connection with the winding shaft 2. As can be seen from the diagrammatic representation of phase 1 and phase 2 of FIG. 4, the motor rotational speed briefly applied for the engagement of the coupling 5 is higher than the set rotational speed for removal of the belt slack, as is shown diagrammatically for phases 3 and 4 for other functions also, such as pre-tightening.

Figure 4:
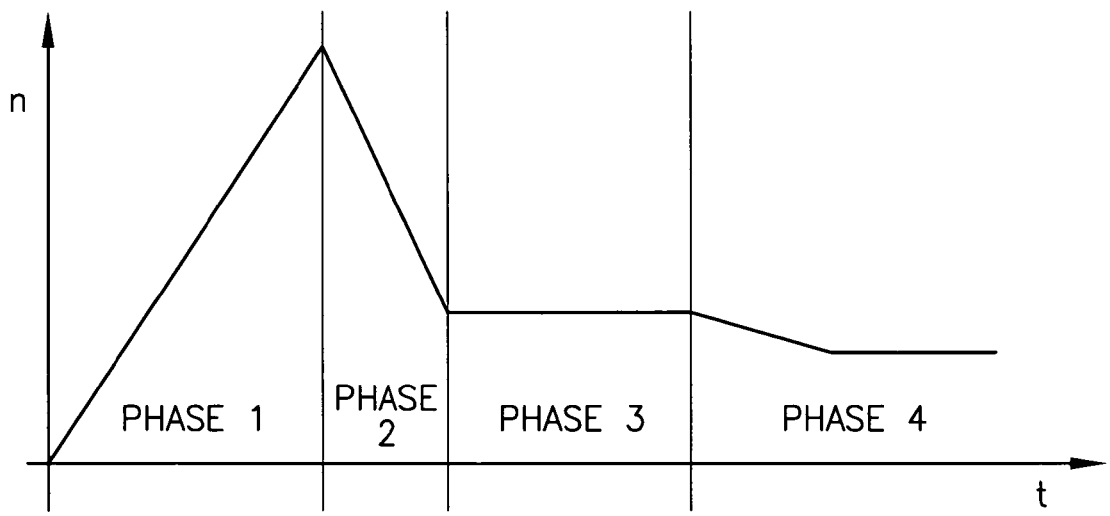
FIG. 4 is a graph depicting the chronological course of motor rotational speed during engagement of a coupling.
Figure 5:
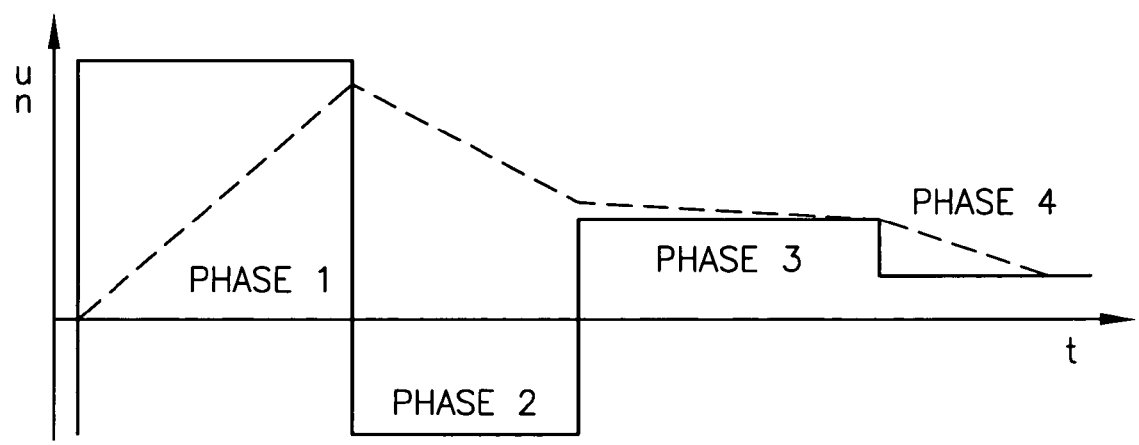
FIG. 5 is a graph showing the chronological course of the electrical tension applied to the electric motor during engagement of the coupling.

FIG. 5 shows in continuous lines the course of the tension applied to the electric motor drive 4. With this tension, in each of the phases 1 to 4 a rotational speed course is achieved as shown in FIG. 4, or as shown in dotted lines in FIG. 5. The timeframe of the individual phases is approximately the following. Phase 1 is completed after approximately 20 msec. Phase 2 is completed after approximately 28 msec and phase 3 is completed after approximately 40 msec. The length of the individual phases can of course differ by approximately 5 msec. As shown in FIG. 5, to engage the coupling, an electrical tension pulse is applied to the electric motor drive 4 in phase 1. The tension applied to the electric motor drive 4 is then significantly reduced in phase 2 and the electrical tension can be reversed in phase 2, as can be seen from FIG. 5. After completion of phase 2 the electrical tension is raised again in phase 3, whereby the tension value lies under the tension value of phase 1. In phase 3, the electrical tension again has the polarity of that in phase 1. After the timeframe of phases 1 and 2, the rotor has carried out only a fraction of a revolution. Only in phase 3 has the rotor carried out a complete revolution. This can take place for instance approximately in the middle or in the first half of the time course of phase 3. In the course of the subsequent phase 4, the motor reaches the rotational speed which is required for the function to be carried out, for instance during removal of the belt slack or during pre-tightening of the seat belt.

The tension course shown in FIG. 5 is put to use preferably during removal of the belt slack, whereby the engagement of the coupling takes place at the latest in phase 3.

When a pre-tightening of the seat belt is to be carried out by a motor torque, the electrical tension which is applied to the motor is not reversed in polarity in phase 2, as is shown in FIG. 5, just lowered, whereby the polarity of the electrical tension remains the same. The tension applied to the motor in phase 1 is measured such that a premature engagement is already carried out in phase 1, as will be described with reference to FIG. 10.

Figure 6:
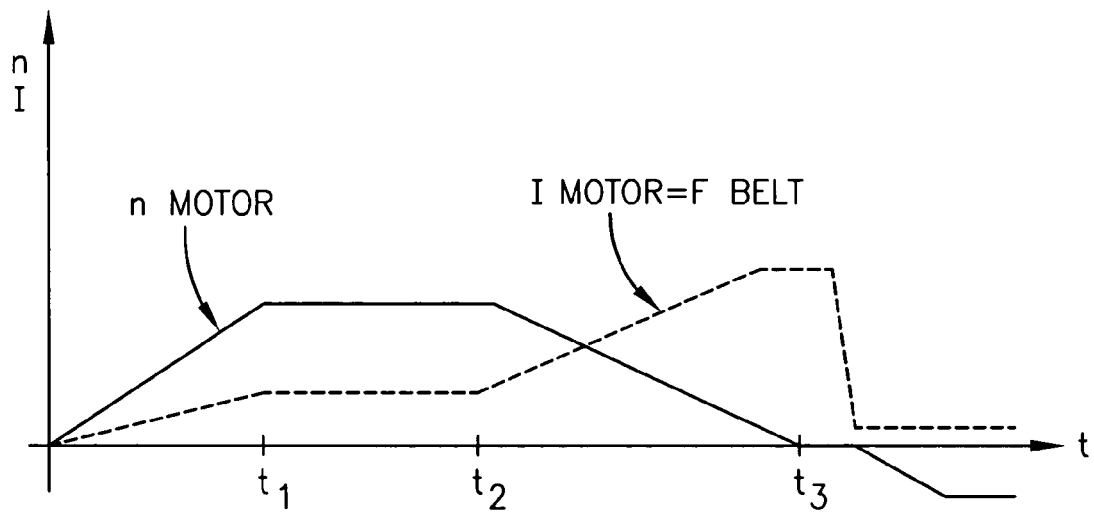
FIG. 6 is a diagram of the motor rotational speed and of the belt force acting on the applied belt webbing during removal of slack of the belt webbing.

The removal of the belt slack after the engagement of the coupling 5 occurs in the manner shown in FIG. 6. In FIG. 6 the curve designated by n indicates the motor rotational speed and the curve designated by F indicates the belt force, which is proportional to the motor current I. The belt force F indicates the force with which the belt webbing of the seat belt is applied to the body of the vehicle occupant. To create the belt force F, a pulling force is applied by the torque of the electric motor drive 4 to the seat belt.

As shown in FIG. 6, after the engagement of the coupling 5, the electric motor drive 4 coupled to the winding shaft 2 is driven ($t_1$) until a determined belt force F is achieved and maintained in a constant manner with a constant belt force. At point in time $t_2$, the belt slack is removed and the belt force increases with a decreasing rotational speed n and a continuously revolving electric motor drive 4. From point in time $t_2$ onwards, the motor rotational speed is decreased down to zero ($t_3$). To release the belt webbing from the belt force, which is at this stage excessive, the electric motor is turned in the opposite direction, i.e. in the belt unwinding direction and the coupling 5 is opened. The desired belt force is then supplied by the restoring force of the motive spring 3.

Figure 7:
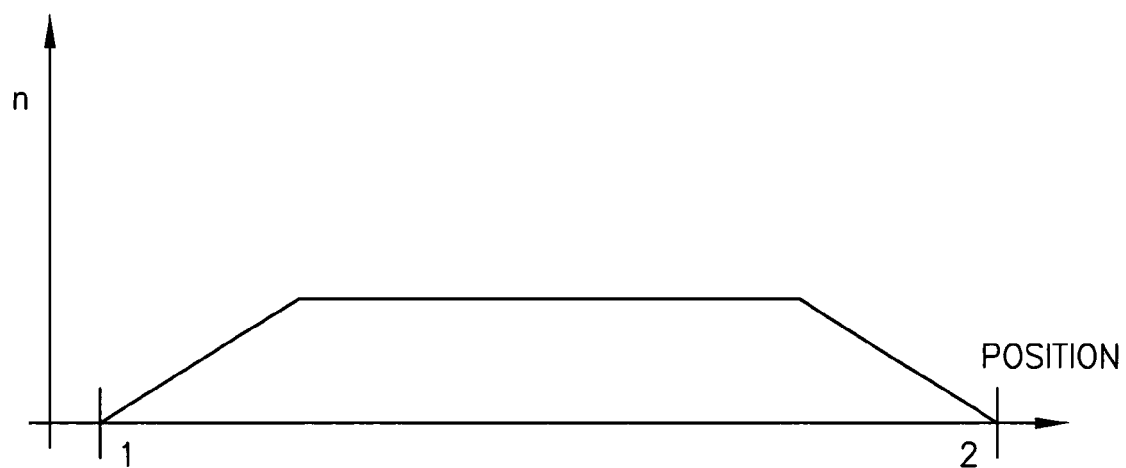
FIG. 7 is a diagram of the motor rotational speed during the moving of the motive spring from a standard position to a comfort position.

After the release of the coupling 5, the restoring force created by the motive spring 3 acts upon the winding shaft 2 and the seat belt 1, whereby after removal of the belt slack the motive spring is in its standard position (position 1 of FIG. 7). This position can be the starting position for the further restraint functions shown in FIG. 3.

Preferably, as a starting position, the motive spring 3 is turned into position 2, which represents the comfort position (FIG. 7). The electric motor drive 4 is driven with a rotational speed, which lies beneath the rotational speed for activating the coupling 5. In this case, for instance, three to six revolutions are transmitted to the outer spring end 10 via the drive wheel 11 and the rigid rotational connection 15. The pre-tensioning force of the motive spring 3 is reduced in this way, so that in position 2 (comfort position) of the motive spring 3, the seat belt 1 is applied to the body of the vehicle occupant with a reduced belt force.

During the adjustment of the starting position, the following criteria can also be taken into account for the control of the electric motor drive 4. With the aid of a sensor 30, the position of the vehicle seat, on which the seat-belt-wearing vehicle occupant is seated, can be detected in the vehicle. With the aid of a sensor 29, the position which the vehicle occupant occupies on the vehicle seat can be monitored and determined. It is possible to adjust the restoring force of the motive spring 3 depending on the driving style of the driver with the aid of an adjustment means 28. The electric motor 3 is driven with a rotational speed below the coupling engagement rotational speed, controlled by the central computer 34, and the outer spring end is rotated into a corresponding position.

Figure 11:
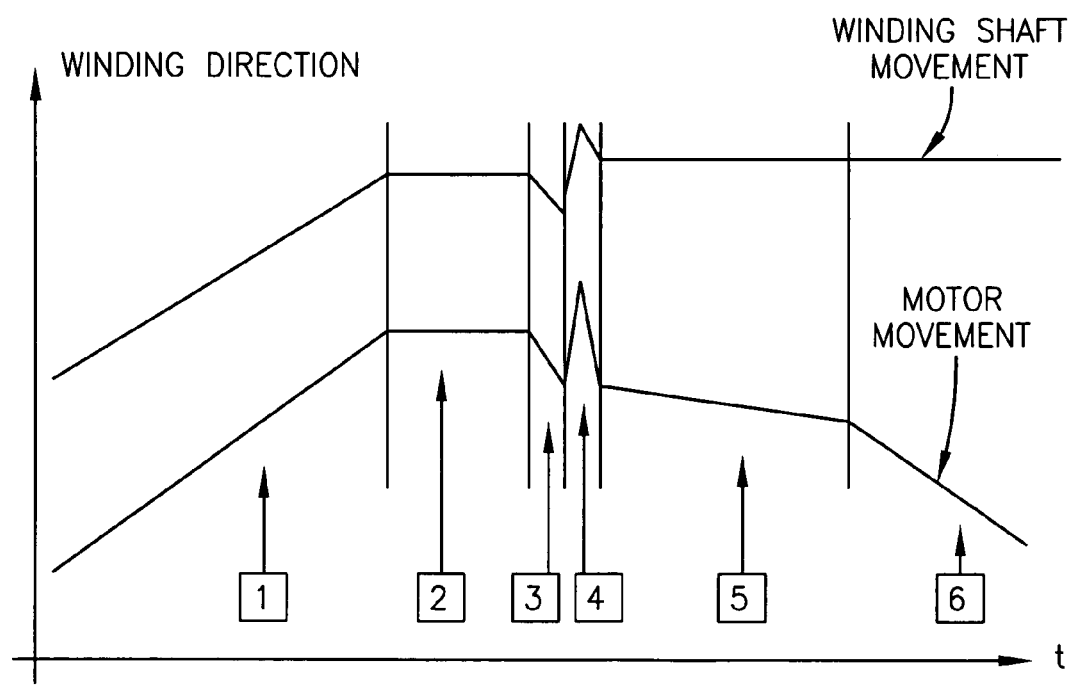
FIG. 11 is a diagram that shows movement of the winding shaft and the electric motor to explain the moving of the winding shaft into the main blocking position.

The adjustment means 28 can be designed in such a manner that the winding shaft is blocked at a certain belt force for a sporty driving style. The measures required for this are described with reference to FIG. 11. In a time interval 1, after the engagement of the coupling at a low rotational speed, which prohibits the pre-blocking of the belt reel, an increasing belt force is applied to the seat belt in phase 1. After a determined belt force has been achieved, the belt force is kept constant during a time interval 2. This can consist of the belt force present during the removal of the belt slack (FIG. 6) between points in time $t_1$ and $t_2$. The belt force can, however, measure more than when in use during the removal of the belt slack. Subsequently, the belt force is briefly (a few msec) reduced in a time interval 3, for instance through reversal of the rotational direction of the electric motor drive 4 in the webbing extraction direction. Subsequently, in a time interval 4, the belt force is increased and decreased in a pulse-like manner, whereby the electric motor drive 4 takes up the seat belt 1 in the webbing winding direction and is then abruptly switched into the webbing extraction direction. During the switching, the seat belt 1 is applied with an increased belt force, so that during the switching of the rotational direction of the electric motor into the webbing extraction direction, the winding shaft 2 is rotated in the webbing extraction direction with a high acceleration by the reaction force carried out by the seat belt and thereby in a known manner the belt webbing sensitive pre-blocking is controlled and, on further webbing extraction, the main blocking of the winding shaft is controlled.

During the abrupt rotational direction reversal of the electric motor from the webbing winding direction to the webbing extraction direction during time interval 4, the coupling is released. To prohibit a new engagement, the electric motor drive is slowly braked and moved back into its starting position (standard position) in time intervals 5 and 6. The winding shaft 2 remains in the controlled main blocking position. The seat belt in this case is applied to the vehicle occupant with the belt force adjusted during phase 2. This belt force can, if necessary, be adjusted by the vehicle occupant with the aid of the adjustment means 28, for instance depending on the desired driving style. The engagement of the main blocking position of the winding shaft can be detected by a detector 25 (FIGS. 1 and 2) and recorded by the central computer 34.

During normal driving conditions the restraint system remains in each case in its adjusted starting position. When the vehicle comes to a stop, the belt buckle is released and the belt buckle sensor 27 issues a corresponding signal to the central computer 34. Subsequently the ignition of the vehicle is switched off.

In the right-hand part of FIG. 3, various danger situations and the restraint functions required in each case are shown diagrammatically. In this case, for instance, the so-called OOP ("Out-Of-Position") is shown, in which the vehicle occupant has moved out of the normal seating position on the vehicle seat during a specific length of time beyond a predetermined distance. This type of position can be detected with the aid of a sensing device 33 which senses the movement of the winding shaft, as is for instance known from U.S. Pat. No. 6,290,159 B1 which is incorporated herein by reference for teaching a sensing device that may be employed in the practice of the present invention. A rotation of the winding shaft 2 indicating the webbing extraction length is hereby detected.

The sensing device 33 detects the belt webbing extraction length from the rotational angle adopted by the winding shaft 2 in the starting position and supplies a corresponding signal to the central computer 34. If a predetermined webbing extraction length is exceeded, the computer 34 causes the electric motor drive 4 to switch on. In this case the motor is driven with a rotational speed engaging the coupling 5 and then the belt webbing is wound with preferably a reduced rotational speed. In this case the vehicle occupant is brought back into the normal seating position with the aid of the torque created by the electric motor drive 4.

The same method can take place if excessive side acceleration or acceleration acting upon the vehicle in a different direction is detected with the aid of an acceleration sensor 32. The acceleration sensor 32 is also connected to the central computer 34, so that the latter, as already mentioned, couples the electric motor drive 4 to the winding shaft 2 via the activated coupling 5 and restrains the vehicle occupant in the vehicle seat with a corresponding restraining force and, if necessary, pulls the vehicle occupant back into the normal seating position earlier.

If a pre-crash sensor detects a situation with an increased likelihood of a crash, for instance an emergency braking, skidding of the vehicle, approaching an obstacle or the like, a pre-crash sensor 31 issues a corresponding signal to the central computer 34. The central computer 34 also causes the switching on of the electric motor drive 4 with the rotational speed engaging the coupling 5 and the seat belt is wound in the webbing winding direction with a high rotational speed, so that the vehicle occupant is held in the vehicle seat with an increased belt force. In this case the main blocking of the winding shaft described with reference to FIG. 11 can be achieved.

Figure 10:
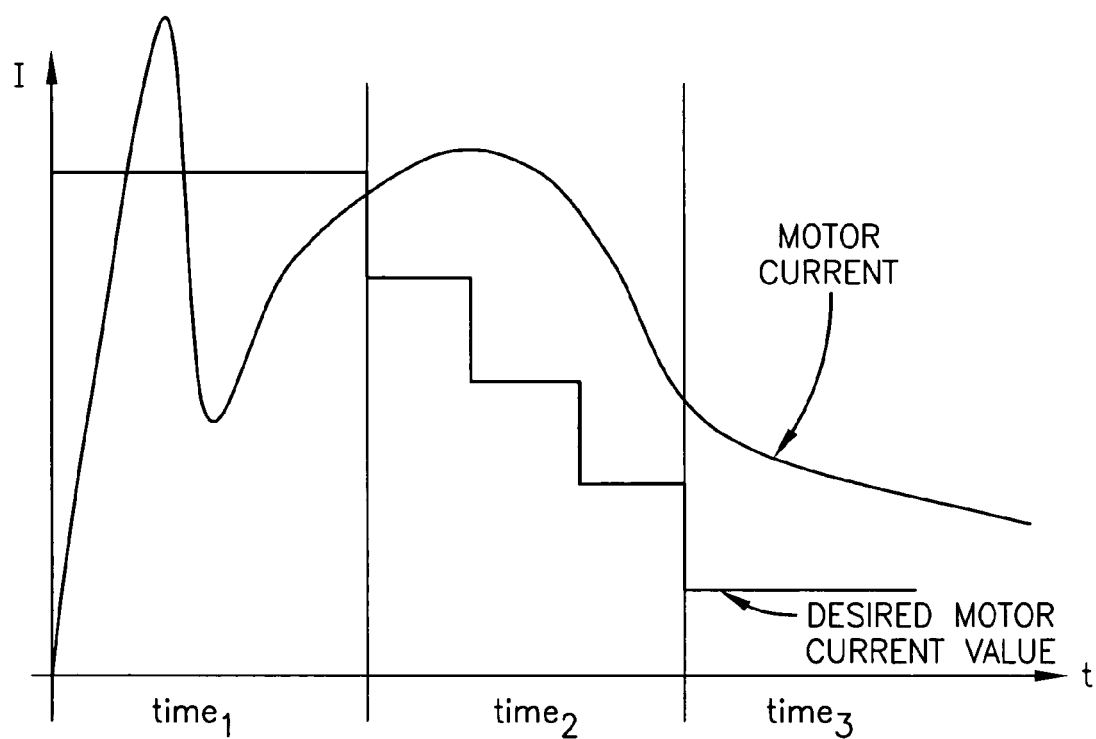
FIG. 10 is a diagram that shows the chronological course of the motor current during engagement and for the slight tightening of the seat belt.

FIG. 10 shows as a function of time t the motor current I required to close the coupling 5 and for weak tightening, as is for instance caused by the sensor 30 for the seating position of the vehicle occupant or the acceleration sensor 32. The motor current is increased in a pulse-like manner in $time_1$ and decreased to approximately half its maximum value or slightly hereunder. At this stage the coupling 5 is engaged. As already mentioned with reference to FIGS. 4 and 5, an impulse-type electrical tension is applied initially to the electric motor drive 4, which is then reduced before the rotor carries out a complete revolution, while maintaining the polarity. This results in the impulse-type increase of the motor current and its reduction in $time_1$. Subsequently the electrical tension is increased again. Here the motor current increases with a corresponding torque increase during $time_2$, whereby the belt webbing is wound without the creation of an "engagement jolt". During $time_3$ the current force is decreased and the seat belt is weakly tightened. The time intervals $time_1$ and $time_2$ each consist of approximately 10 to 30 ms. In this manner a secure engagement of the coupling 5 is achieved, in relation to the rotational speed or the acceleration, without the tightening of the seat belt having an abrupt effect on the belt force with which the seat belt is applied to the body of the vehicle occupant.

Figure 8:
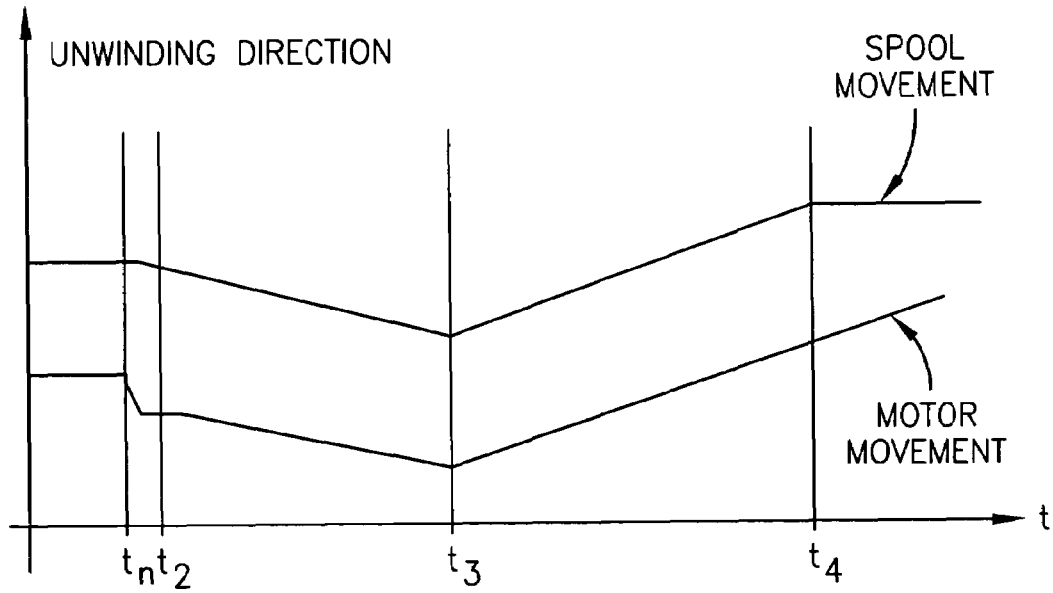
FIG. 8 is a diagram showing movement for the winding shaft and motor rotational speed during the release of the winding shaft out of a revolution-blocking state (main blocking position) as a function of time.
Figure 9:
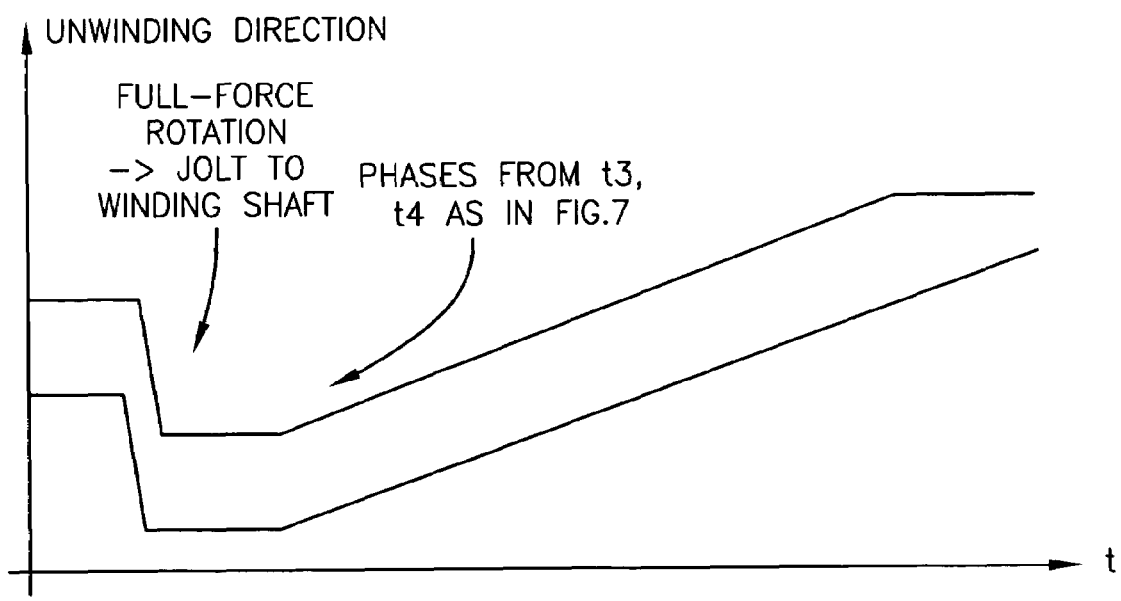
FIG. 9 is a diagram of the motor and winding shaft movement during the disengagement, whereby a strong counter-force acts upon the applied belt webbing.

The release of the winding shaft 2 out of the main blocking position, in which the winding shaft is blocked against a further rotation in the webbing extraction direction, is explained in FIGS. 8 and 9.

In a phase between time points $t_1$ and $t_2$ (FIG. 8) the coupling 5 is engaged by the motor rotational speed and the winding shaft 2 is brought into a rotational connection with the electric motor drive 4. The electric motor drive 4 turns the winding shaft 2 in the webbing extraction direction, whereby the main blocking position, in particular the main blocking catch, is released from its engaged position and the belt webbing sensitive pre-blocking, in particular the pre-blocking catch, is released on the basis of a restoring force, for instance a spring force (time point $t_3$). Preferably only gradually increasing belt force is achieved. During further rotation in the belt winding direction between time points $t_3$ and $t_4$, the belt webbing is eased, i.e. the belt force is reduced, until the winding shaft is positioned at $t_4$ and the coupling is opened with further rotation of the electric motor drive 4 in the belt extraction direction.

If at time point $t_3$ an excessively high counter-force is present against the release of the main blocking position due to a high belt force, the main blocking catch remains in its blocking position. This position can be detected by the detector 25 and a corresponding signal can be issued to the central computer 34. The central computer 34 causes the motor, which is still connected to the winding shaft 2 via the engaged coupling 5, to rotate with a high acceleration in the webbing winding direction according to FIG. 9. Then the main blocking catch is released out of its blocking toothed engagement by surmounting the counter-force acting upon the belt, and the belt webbing is released by rotation of the winding shaft in the belt extraction direction.

The release of the main blocking position can also be carried out by the sensing device 33, with which the winding shaft rotation is detected. If after the rotation of the winding shaft 2 in the webbing extraction direction no winding shaft rotation in the webbing extraction direction is detected by the sending device 33 at time point $t_3$, this indicates that the main blocking position of the winding shaft 2 is still present. The strong disengagement process already mentioned in FIG. 9 is then carried out. An embodiment for the sensor 14 with belt webbing sensitive pre-blocking and controllable main blocking is known from U.S. Pat. No. 6,283,398 B1 which is incorporated herein by reference for the purpose of teaching a sensor and belt webbing sensitive pre-blocking and controllable main blocking usable in the practice of the present invention.

As can be seen from FIG. 3, the end positions produced by gentle tightening or strong tightening can be reversed with the aid of the electric motor, so that the starting position, in which the restoring force of the motive spring 3 acts upon the winding shaft 2 and the seat belt 1, can be restored. This is carried out by the electric motor drive 4 being rotated in the webbing winding direction and the coupling 5 being released. To repeatedly carry out the above functions, the electric motor drive 4 is connected to a (not further represented) rechargeable energy or current supply. This type of reversibly chargeable energy source of a connected electric motor drive is known from WO 01/45985 A1 which is incorporated herein by reference for teaching a reversibly chargeable energy source that may be employed in the practice of the present invention.

To carry out the mentioned functions, the coupling 5 is designed in such a way that, with a corresponding rotational speed of the drive wheel 11 driven by the electric motor drive 4 and of a co-rotating coupling part in the webbing winding direction or with a corresponding acceleration of one of its coupling parts, in particular of the coupling element carrier, it becomes engaged and is opened during a rotation in the webbing extraction direction.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

I claim:

1. A seat belt retractor comprising:
a winding shaft to wind a seat belt;
a motive spring that pretensions the winding shaft in a seat belt winding direction;
a spring housing in which the motive spring is arranged on a side of the spring housing;
an electric motor, from which a torque can be transmitted to the motive spring to change a spring force;
a shaft extension that is non-rotatably and coaxially connected to the winding shaft;
a drive means that is non-rotatably connected to an outer spring end of the motive spring by a rigid rotational connection connected to the spring housing, the drive means being rotatably mounted on the shaft extension; and
a switch coupling located radially inside the rigid rotational connection, via which the torque of the electric motor can be transmitted to the winding shaft to retract the seat belt, the switch coupling having a first active surface, a second active surface, a coupling part and a second coupling part, the first active surface being located on the coupling part mounted in a movable manner to the spring housing on an opposite side of the spring housing relative to the motive spring and movably mounted against a restoring force to the coupling part which is securely connected through the spring housing to the rigid rotational connection and rotatable around the shaft extension and the second active surface of the switch coupling is non-rotatably connected to the shaft extension by the second coupling part; encircling the coupling part to transmit torque of the electric motor to the winding shaft the switch coupling has the first active surface brought into an engaged position with the second active surface causing the rotation of the shaft extension to rotate the winding shaft wherein the rigid rotational connection provides transmission of force or torque from the drive means to the motive spring.

2. The seat belt retractor according to claim 1, wherein the first active surface of the switch coupling can be moved into an engaged position with the second active surface by an electromagnetic signal or by inertial or a centrifugal force.

3. The seat belt retractor according to claim 2, wherein the drive means is a gear comprising a drive wheel that transmits the torque.

4. The seat belt retractor according claim 3, wherein the electric motor, the motive spring and the switch coupling are a unit that can be assembled on the shaft extension.

5. The seat belt retractor according to claim 3, wherein the drive wheel of the gear is a gear wheel.

6. The seat belt retractor according to claim 3, wherein the gear further comprises a screw gear, comprising a front screw gear, or a worm gear.

7. The seat belt retractor according to claim 3, wherein the gear is a worm gear in combination with the drive wheel.

8. The seat belt retractor according to claim 3, wherein the gear, the switch coupling and the motive spring are located on a side of the seat belt retractor on which a vehicle sensor and a belt webbing sensitive sensor are also located.

9. The seat belt retractor according to claim 8, wherein the seat belt retractor has another side where a pyrotechnic driven tightening means is located, the pyrotechnic driven tightening means arranged to drive the winding shaft in the winding direction to tighten the seat belt.

10. The seat belt retractor according to claim 9, wherein the electric motor and the pyrotechnic driven tightening means are secured to a seat belt retractor frame.

11. The seat belt retractor according to claim 10, wherein a unit consisting of the gear, the switch coupling and the motive spring is also secured to the seat belt retractor frame.

12. The seat belt retractor according to claim 8, wherein the electric motor can be activated by a sensor signal indicating a dangerous driving situation.

13. The seat belt retractor according to claim 1, wherein the drive means is a gear that transmits the torque.

14. The seat belt retractor according claim 1, wherein the electric motor, the motive spring and the switch coupling are a unit that can be assembled on the shaft extension.

15. The seat belt retractor according to claim 1, wherein the switch coupling is located between the driving means and the motive spring.

16. The seat belt retractor according to claim 1, wherein the switch coupling is engaged at a minimum rotational speed or a minimum acceleration in during rotation of the winding shaft in the belt winding direction and released during rotation of the winding shaft in a belt extraction direction.

17. A seat belt retractor comprising:
a winding shaft to wind a seat belt;
a motive spring that pretensions the winding shaft in a seat belt winding direction;
a spring housing in which the motive spring is arranged on a side of the spring housing;
a shaft extension that is non-rotatably and coaxially connected to the winding shaft;
a drive means that is non-rotatably connected to an outer spring end of the motive spring by a rigid rotational connection connected to the spring housing, the drive means being rotatably mounted on the shaft extension;
an electric motor, from which a torque can be transmitted to the motive spring to change a spring force, wherein the electric motor can be activated by a sensor signal indicating a dangerous driving situation;
a switch coupling located radially inside the rigid rotational connection via which the torque of the electric motor can be transmitted to the winding shaft to retract the seat belt, the switch coupling having a first active surface, a second active surface, a coupling part and a second coupling part, the first active surface being located on the coupling part mounted in a movable manner to the spring housing on an opposite side of the spring housing relative to the motive spring and movably mounted against a restoring force to the coupling part which is securely connected through the spring housing to the rigid rotational connection and rotatable around the shaft extension and the second active surface of the switch coupling is non-rotatably connected to the shaft extension by the second coupling part; to transmit torque of the electric motor to the winding shaft the switch coupling has the first active surface brought into an engaged position with the second active surface causing the rotation of the shaft extension to rotate the winding shaft wherein the rigid rotational connection provides transmission of force or torque from the drive means to the motive spring, wherein the first active surface of the coupling can be moved into an engaged position with the second active surface by an electromagnetic signal or by inertial or a centrifugal force; and a pyrotechnic driven tightening means arranged to drive the winding shaft in the winding direction to tighten the seat belt.

18. A seat belt retractor comprising:

a winding shaft to wind a seat belt;

a motive spring that pretensions the winding shaft in a seat belt winding direction;

a spring housing in which the motive spring is arranged on a side of the spring housing;

a shaft extension that is non-rotatably and coaxially connected to the winding shaft;

a drive means that is non-rotatably connected to an outer spring end of the motive spring by a rigid rotational connection connected to the spring housing, the drive means being rotatably mounted on the shaft extension;

an electric motor, from which a torque can be transmitted to the motive spring to change a spring force, wherein the electric motor can be activated by a sensor signal indicating a dangerous driving situation; a switch coupling located radially inside the rigid rotational connection, via which the torque of the electric motor can be transmitted to the winding shaft to retract the seat belt, the switch coupling having a first active surface, a second active surface, a coupling part and a second coupling part, the first active surface being located on the coupling part mounted in a movable manner to the spring housing on an opposite side of the spring housing relative to the motive spring and movably mounted against a restoring force to the coupling part which is securely connected through the spring housing to the rigid rotational connection and rotatable around the shaft extension and the second active surface of the switch coupling is non-rotatably connected to the shaft extension by the second coupling part; to transmit torque of the electric motor to the winding shaft the switch coupling has the first active surface brought into an engaged position with the second active surface causing the rotation of the shaft extension to rotate the winding shaft wherein the rigid rotational connection provides transmission of force or torque from the drive means to the motive spring, wherein the first active surface of the coupling can be moved into an engaged position with the second active surface by an electromagnetic signal or by inertial or a centrifugal force;

a pyrotechnic driven tightening means arranged to drive the winding shaft in the winding direction to tighten the seat belt; and the coupling and the motive spring are located on a side of the seat belt retractor on which a vehicle sensor and a belt webbing sensitive sensor are also located, and the seat belt retractor has another side where the pyrotechnic driven tightening means is located.

* * * * *